METHOD AND APPARATUS FOR SEPARATING GASEOUS MIXTURES

Original Filed Aug. 16, 1957 6 Sheets-Sheet 1

INVENTORS
CLARENCE J. SCHILLING
LILBURN CARROLL CLAITOR

BY Shanley & O'Neil
ATTORNEYS

METHOD AND APPARATUS FOR SEPARATING GASEOUS MIXTURES

Original Filed Aug. 16, 1957 6 Sheets-Sheet 2

INVENTORS
CLARENCE J. SCHILLING
LILBURN CARROLL CLAITOR

BY Stanley & O'Neil
ATTORNEYS

METHOD AND APPARATUS FOR SEPARATING GASEOUS MIXTURES

Original Filed Aug. 16, 1957 6 Sheets-Sheet 3

INVENTORS
CLARENCE J. SCHILLING
LILBURN CARROLL CLAITOR
BY Shanley & O'Neil
ATTORNEYS

METHOD AND APPARATUS FOR SEPARATING GASEOUS MIXTURES

Original Filed Aug. 16, 1957 6 Sheets-Sheet 4

INVENTORS
CLARENCE J. SCHILLING
LILBURN CARROLL CLAITOR

BY Shanley & O'Neil

ATTORNEYS

METHOD AND APPARATUS FOR SEPARATING GASEOUS MIXTURES

Original Filed Aug. 16, 1957 6 Sheets-Sheet 5

INVENTORS
CLARENCE J. SCHILLING
LILBURN CARROLL CLAITOR

BY Shanley & O'Neil
ATTORNEYS

METHOD AND APPARATUS FOR SEPARATING GASEOUS MIXTURES

Original Filed Aug. 16, 1957 6 Sheets-Sheet 6

INVENTORS
CLARENCE J. SCHILLING
LILBURN CARROLL CLAITOR
BY Shanley & O'Neil
ATTORNEYS United States Patent Office Re. 25,193
Reissued July 3, 1962

25,193

METHOD AND APPARATUS FOR SEPARATING GASEOUS MIXTURES

Clarence J. Schilling and Lilburn Carroll Claitor, Allentown, Pa., assignors, by mesne assignments, to Air Products and Chemicals, Inc., Trexlertown, Pa., a corporation of Delaware Original No. 2,997,854, dated Aug. 29, 1961, Ser. No. 681,130, Aug. 16, 1957. Application for reissue Jan. 3, 1962, Ser. No. 165,983
(Filed under Rule 47(a) and 35 U.S.C. 116)
21 Claims. (Cl. 62—13)

Matter enclosed in heavy brackets [ ] appears in the original patent but forms no part of this reissue specification; matter printed in italics indicates the additions made by reissue.

This invention relates to improvements in the separation of gaseous mixtures by a low temperature fractionating operation and more particularly to methods of and apparatus for removing from the fractionating operation high boiling point impurities introduced into the operation with the gaseous mixture.

It is known that high boiling point impurities present in gaseous mixtures must be removed or reduced to comprise an insignificant percentage of the gaseous mixture in order to prevent difficulties in the operation of low temperature fractionating cycles. For example, in the separation of air into oxygen and nitrogen components, the normal content of carbon dioxide in the air feed to the cycle precipitates and collects in the cycle, especially in the colder portions of the cycle, and affects operation of the cycle and eventually requires the cycle to be shut down for defrosting. In order to obtain substantially continuous operation it is necessary to remove substantially the total carbon dioxide entering the cycle with the air feed. Also it is necessary to provide means for removing from the cycle other high boiling point components of the air feed, particularly hydrocarbons which, when concentrated in the cycle, constitute serious explosion hazards.

Several methods have been employed in the past for removing high boiling point impurities from gaseous mixtures, such as the removal of carbon dioxide from air. In one method the air feed prior to its entry into the fractionating cycle is chemically treated, by scrubbing with a caustic solution for example, to remove the carbon dioxide. This method requires bulky equipment and materially increases the initial and operating costs. Another method attempts to remove the carbon dioxide by low temperature precipitation. This is accomplished by the use of switching heat exchange zones of the regenerator or recuperative type by which the stream of incoming compressed air is cooled to a temperature below the precipitation temperature of carbon dioxide in heat interchange with a stream of relatively cold product of the fractionating operation. The carbon dioxide precipitated from the air feed collects in one passageway of the heat exchange zone and when the heat exchange zone is switched the product gas is caused to flow through the passageway in which the carbon dioxide has deposited, countercurrent to the direction of flow of the air feed therethrough, to sweep out the carbon dioxide deposits. Due to the difference of the specific heat of high pressure air and low pressure product gases at low temperature, means must be provided to "unbalance" the heat exchange zone in order to substantially completely remove carbon dioxide deposits by the outflowing product stream. Even in cycles employing "unbalanced" heat exchange zones, particles of carbon dioxide are entrained in the air feed flowing from the heat exchange zone and accumulate at some point in the cycle producing malfunctions and eventually requiring shutdown for defrosting. In addition, switching type heat exchange devices are expensive to manufacture and the required switching presents mechanical and operational difficulties.

In copending application of Clarence J. Schilling and Clyde McKinley, Serial No. 576,963, filed April 9, 1956 for "Method and Apparatus for Separating Gaseous Mixtures Including High Boiling Point Impurities," *now Patent No. 2,968,160,* there is disclosed an arrangement for substantially completely removing from a fractionating cycle high boiling point impurities introduced into the cycle with the feed mixture without employing chemical scrubbing or switching heat exchange zones. According to the method and apparatus disclosed and claimed in this copending application, gaseous feed mixture enters the cycle under a predetermined relatively high pressure and is cooled in heat exchange effecting relation with cold product gas without precipitation of high boiling point impurity in the passageway of a non-switching heat exchange zone and the stream is then expanded to a relatively low pressure, such as a pressure as exists in the fractionating zone, to establish the pressure and temperature conditions for precipitation of high boiling point impurity. The expanded gaseous mixture includes precipitated high boiling point impurity and high boiling point impurity dissolved in the gaseous mixture. A fluid stream including substantially the total high boiling point impurity of the gaseous mixture is formed from the stream of expanded gaseous mixture and passed through filter and adsorber zones to substantially completely remove high boiling point impurity therefrom. Precipitated high boiling point impurity is substantially removed in the filter zone, while high boiling point impurity dissolved in the fluid stream and precipitated high boiling point impurity that may flow through the filter zone are removed in the adsorber zone. From the adsorber zone the fluid stream is fed to a fractionating zone for low temperature separation.

In one type of fractionating cycle constructed in accordance with the principles of the Schilling and McKinley application discussed above, expanded gaseous feed mixture is fed to the high pressure zone of a two stage fractionating column and the fluid stream passed through the filter and adsorber zones comprises a stream of liquid fraction withdrawn from the base of the high pressure section, such as a stream of liquid crude oxygen in the case of the separation of air. It has been discovered that in this type of cycle certain physical characteristics of the feed mixture are critical with respect to the percentage of the total high boiling point impurity contained in the fluid stream passed through the filter and adsorber zones. In particular, in a cycle of the above type in which a portion of the feed mixture is expanded with work in order to provide refrigeration required to produce a liquid product, it has been determined that a substantial portion of the high boiling point impurity precipitates on the lower fractionating tray or trays of the high pressure zone and affects fractionating efficiency. It is believed that this undesirable performance results from the fact that the effluent from the expansion engine comprises superheated vapor and that the high boiling point impurity contained in the superheated vapor is not cooled to precipitation temperature prior to contact with the lower fractionating tray of the high pressure zone or prior to reaching a region adjacent the lowermost fractionating tray.

It is an object of the present invention to provide a novel method and apparatus which solves the foregoing problem.

Another object is to provide a novel method and apparatus for removing high boiling point impurities from a fractionating operation.

Still another object of the present invention is to provide a novel method of and apparatus for removing high boiling point impurities from a fractionating cycle in which the gaseous feed mixture is cooled to different relatively low temperatures.

In general, according to the principles of the present invention substantially the total high boiling point impurity may be removed from gaseous feed mixture through the use of filter and adsorber zones by conditioning the gaseous feed mixture in a novel manner to insure that substantially the total high boiling point impurity is precipitated or dissolved in a fluid that may comprise a portion of the gaseous feed mixture or a fluid including components of the gaseous feed mixture. The required conditioning of gaseous feed mixture may be accomplished according to the present invention by intermixing portions of the gaseous feed mixture at different relatively low temperatures, or by intermixing the total gaseous feed mixture or a portion of the gaseous feed mixture with a fluid including components of the gaseous feed mixture, or by a combination of separation and intermixing steps.

Other objects and features of the present invention will appear more fully below from the following detailed description considered in connection with the accompanying drawings which disclose several embodiments of the invention. It is to be expressly understood that the drawings are designed for purposes of illustration only and not as a definition of the limits of the invention, reference for the latter purpose being had to the appended claims.

In the drawings, in which similar reference characters denote similar elements throughout the several views.

Figure 1:
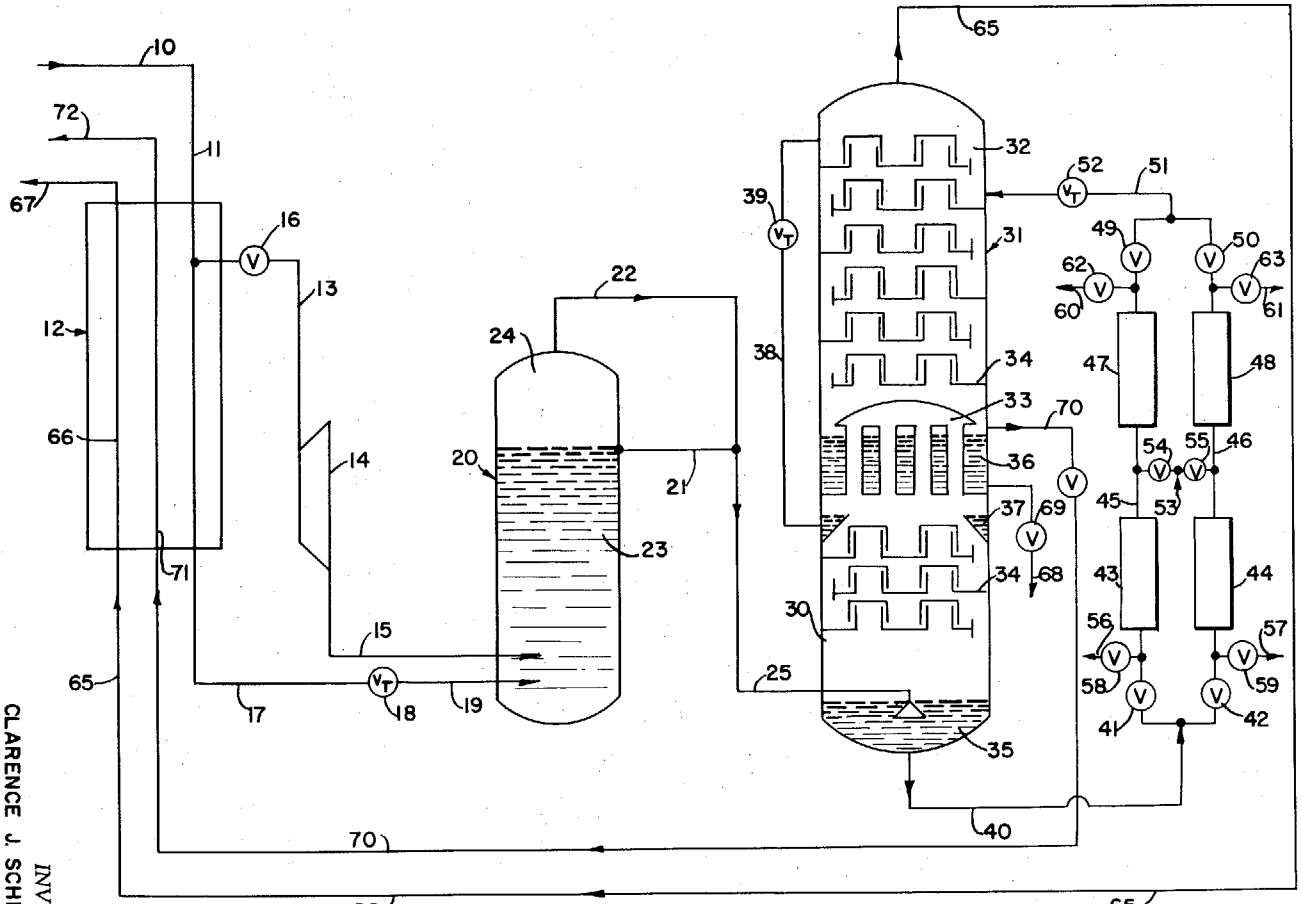
FIGURE 1 is a diagrammatic illustration of a fractionating cycle embodying the principles of the present invention.

With reference more particularly to FIGURE 1 of the drawings, a fractionating cycle embodying the principles of the present invention is disclosed therein for separating low boiling components of gaseous mixtures including higher boiling point impurities. Gaseous feed mixture, such as atmospheric air under superatmospheric pressure and substantially free of moisture, enters the cycle through conduit 10 and is conducted thereby to path 11 of heat exchange device 12 for heat exchange effecting relationship with cold product of a fractionating operation described in detail below. A first stream of gaseous feed mixture, comprising a portion of the total gaseous mixture, is withdrawn from the path 11 by a conduit 13 and conducted thereby to an expansion engine 14 wherein the first stream of the gaseous mixture is expanded with the production of work to a relatively low superatmospheric pressure. The first stream of gaseous mixture is withdrawn from the path 11 at a temperature such that liquid does not form in the expansion engine 14 and the effluent from the expansion engine in the conduit 15 is cooled to a temperature within the superheat region at the relatively low pressure. The temperature of the expansion engine effluent may be above the precipitation temperature of high boiling point impurities in the gaseous mixture, such as carbon dioxide in the case of air feed, and the superheated vapor from the expansion engine includes gaseous high boiling point impurities. A control valve 16 is provided in the conduit 13 to determine the percentage of the total feed mixture passed to the expansion engine. The remaining portion of the feed mixture, or second stream of feed mixture, flows through the path 11 and emerges from the cold end of the heat exchange device 12 in conduit 17 at a temperature slightly above saturation temperature at the existing pressure and is then expanded in valve 18 to a relatively low superatmospheric pressure corresponding to the pressure of the effluent from the expansion engine. The second stream of the feed mixture upstream of the expansion valve 18 is above a critical pressure so that high boiling point impurities remain in gaseous phase, however the pressure and temperature conditions downstream of the expansion valve are such that high boiling point impurities precipitate and a portion of the feed mixture may be liquefied.

In accordance with the principles of the present invention, the first stream of superheated gaseous mixture from the expansion engine is cooled to a temperature at least corresponding to the precipitation temperature of the high boiling point impurities at the existing pressure in order to concentrate substantially the total high boiling point impurity of the total feed mixture in a fluid stream for passage to filter and adsorber zones. This is accomplished in the embodiment of the invention shown in FIGURE 1 by intermixing the first and second streams of feed mixture in such a manner as to concentrate substantially the total high boiling point impurity in the liquid portion of the feed mixture. The intermixing may or may not comprise a heat interchange resulting in the total gaseous mixture being at a substantially uniform temperature, such as saturation temperature, depending at least in part upon the precipitation temperature of the high boiling point impurities. As shown in FIGURE 1, the conduits 15 and 19 feed the first and second streams of gaseous mixture to the base of a conglomerator 20 which comprises a closed vessel including a liquid outlet conduit 21 and a vapor outlet conduit 22. The liquid outlet conduit 21 communicates with the vessel at a medial level dividing the vessel into a lower liquid receiving chamber 23 and an upper vapor receiving chamber 24. The size of the liquid receiving chamber 23 is designed so that vapor entering the chamber 24 is substantially free of high boiling point impurity. As mentioned above, vapor entering the chamber 24 may be at a temperature above the temperature of the liquid in the chamber 23 or the vapor and liquid withdrawn from the conglomerator may be at a substantially uniform temperature, such a saturation temperature depending in part upon the precipitation temperature of the high boiling point impurities in the gaseous mixture. In any event, the vapor portion withdrawn from the conglomerator in the conduit 22 is substantially free of high boiling point impurities and substantially the total high boiling point impurities are concentrated in the liquid portion withdrawn through the conduit 21, either as precipitated high boiling point impurity or as high boiling point impurity dissolved in the liquid portion. The conduits 21 and 22 are connected to a conduit 25 and the total feed mixture is fed thereby to a high pressure section 30 of a two-stage fractionating column 31 which may be of conventional construction including a low pressure section 32 and a refluxing condenser 33, the high pressure section 30 and the low pressure section 32 being provided with suitable liquid-vapor contact means such as fractionating trays 34. The feed mixture undergoes preliminary separation in the high pressure section 30 producing a high boiling point liquid fraction collecting in a pool 35 in the base of the column and a gaseous low boiling point fraction which flows upwardly into the refluxing condenser 33 and is liquefied therein in heat exchange effecting relation with liquid high boiling point component collecting in a pool 36 in the base of the low pressure section and surrounding the tubes of the refluxing condenser. Liquefied low boiling point fraction flows downwardly from the refluxing condenser with a part entering the low pressure section as reflux and with another part being collected in a pool 37 below the refluxing condenser from which a stream is withdrawn by conduit 38, expanded in valve 39 and introduced into the upper end of the low pressure section as reflux. A stream of liquid high boiling point fraction is withdrawn from the pool 35 by way of a conduit 40 as feed for the low pressure section. As described in the copending application of Clarence J. Schilling and Clyde McKinley discussed above, the stream of high boiling point liquid fraction is passed in series through filter and adsorber zones and then expanded and introduced into the low pressure section. As shown in the drawings, the conduit 40 is connected through switching valves 41 and 42 to filters 43 and 44. The filters are connected by conduits 45 and 46 to absorbers 47 and 48, respectively, and the adsorbers are connected through switching valves 49 and 50 to a conduit 51 communicating with the low pressure section. An expansion valve 52 is included in the conduit 51 for reducing the pressure of the stream of high boiling point fraction to correspond to the pressure of the low pressure section. Upon operation of the switching valves 41, 42, 49 and 50, the stream of liquid high boiling point fraction is caused to flow serially through filter 43 and adsorber 47 or serially through filter 44 and adsorber 48 on its way to the low pressure section. High boiling point impurity is substantially removed from the stream of liquid high boiling point fraction upon flowing through a filter-adsorber combination. Precipitated high boiling point impurity is substantially completely removed in the filters 43 or 44 and the adsorbers 47 and 48 substantially completely remove high boiling point impurity dissolved in the liquid as well as particles of precipitated high boiling point impurity that may pass through the filters. The filter-adsorber combinations are provided in duplicate so that upon operation of the switching valves 41, 42, 49 and 50 one combination is on-stream while the other combination is off-stream for reactivation and purging operations. The latter operations may be accomplished according to the principles of the copending application by flowing a warm fluid stream, such as a stream of warm product gas, from conduit 53 to the conduit 45 or the conduit 46 depending upon the position of the control valves 54 and 55. The purging stream thus flows through the filters 43 or 44 in countercurrent relation with the stream of high boiling point fraction and leaves the cycle through outlet conduits 56 or 57 provided with control valves 58 and 59 respectively, and flows through the adsorbers 47 or 48 in concurrent relation with the stream of high boiling point fraction and leaves the cycle through outlet conduits 60 or 61 provided with control valves 62 and 63.

Separation of the gaseous mixture is completed in the low pressure section producing high boiling point component collecting in liquid phase in the pool 36 and low boiling point component which flows upwardly into the dome of the fractionating column and is withdrawn therefrom by way of a conduit 65. The conduit 65 conducts a stream of low boiling point component to the cold end of path 66 of the heat exchange device 12 wherein the low boiling point component is warmed in countercurrent heat exchange effecting relation with incoming feed mixture in the path 11, the warmed stream leaving the cycle by way of a conduit 67 at substantially ambient temperature and atmospheric pressure. High boiling point component may be withdrawn from the column in liquid phase by way of a conduit 68 provided with a control valve 69, or a part of the high boiling point component may be delivered in gaseous phase by way of a conduit 70 which communicates with path 71 of the heat exchange device 12 wherein the stream of gaseous high boiling point component flows in countercurrent heat exchange effecting relation with incoming feed mixture and is warmed and leaves the cycle by way of a conduit 72 at substantially atmospheric pressure and ambient temperature.

The total gaseous mixture entering the high pressure section 30 through the conduit 25 is partly in liquid phase and partly in vapor phase with substantially the total high boiling point impurity being concentrated in the liquid portion of the feed mixture, either as precipitated high boiling point impurity or as dissolved high boiling point impurity, due to the action of the conglomerator 20 as described above. Upon introduction of the feed mixture into the low pressure section the liquid portion mixes with the liquid in the pool 35 and substantially the total high boiling point impurity collects in the liquid low boiling point fraction and is subsequently removed from the cycle by the action of the filter-adsorber combinations as discussed above. Vapor flowing upwardly toward the fractionating plates of the high pressure section is substantially free of high boiling point impurity and the fractionating trays remain substantially free of precipitated high boiling point impurity. The foregoing performance may be obtained by introducing the feed mixture into the high pressure column above the pool 35 or beneath the liquid high boiling point fraction as shown in the drawing.

In operation of the cycle shown in FIGURE 1, for separating air into oxygen and nitrogen components, dry air under a pressure about 3000 p.s.i.g. enters the cycle through the conduit 10 with a portion of the air feed flowing through the path 11 in countercurrent heat exchange effecting relation with cold nitrogen product and emerging from the path 11 at a temperature of about −245° F. In the expansion valve 19 the air feed is expanded to about 85 p.s.i.g. with a concomitant drop in temperature to about −278° F. and partial liquefaction takes place. Since the pressure of the air feed is above about 550 p.s.i.g. the air feed leaving the cold end of the heat exchanger 12 is above the precipitation temperature of carbon dioxide, however, the temperature and pressure conditions existing downstream of the expansion valve 19 are such that carbon dioxide precipitates. The remaining portion of the air is withdrawn from the path 11 at about −100° F. and is expanded in the expansion engine 14 to about 85 p.s.i.g. and cooled to a temperature of about −190° F. Thus the effluent from the expansion engine comprises superheated vapor including gaseous carbon dioxide. The streams of air feed are introduced into the conglomerator wherein carbon dioxide is precipitated from the superheated vapor and substantially the total carbon dioxide is concentrated in the liquid portion of the air either as precipated carbon dioxide or as dissolved carbon dioxide. Inasmuch as carbon dioxide under 85 p.s.i.g. first precipitates at a temperature of about −215° F., it is only necessary to cool the superheated vapor to below this temperature and not to saturation temperature of about −280° F. The combined air feed is introduced into the high pressure section with substantially the total carbon dioxide being concentrated in the liquid high boiling point fraction, crude oxygen, and subsequently removed therefrom upon flowing the feed to the low pressure section through the filter-adsorber combinations. Of course, other high boiling point components, such as hydrocarbons, are removed from the air feed along with the carbon dioxide.

Figure 2:
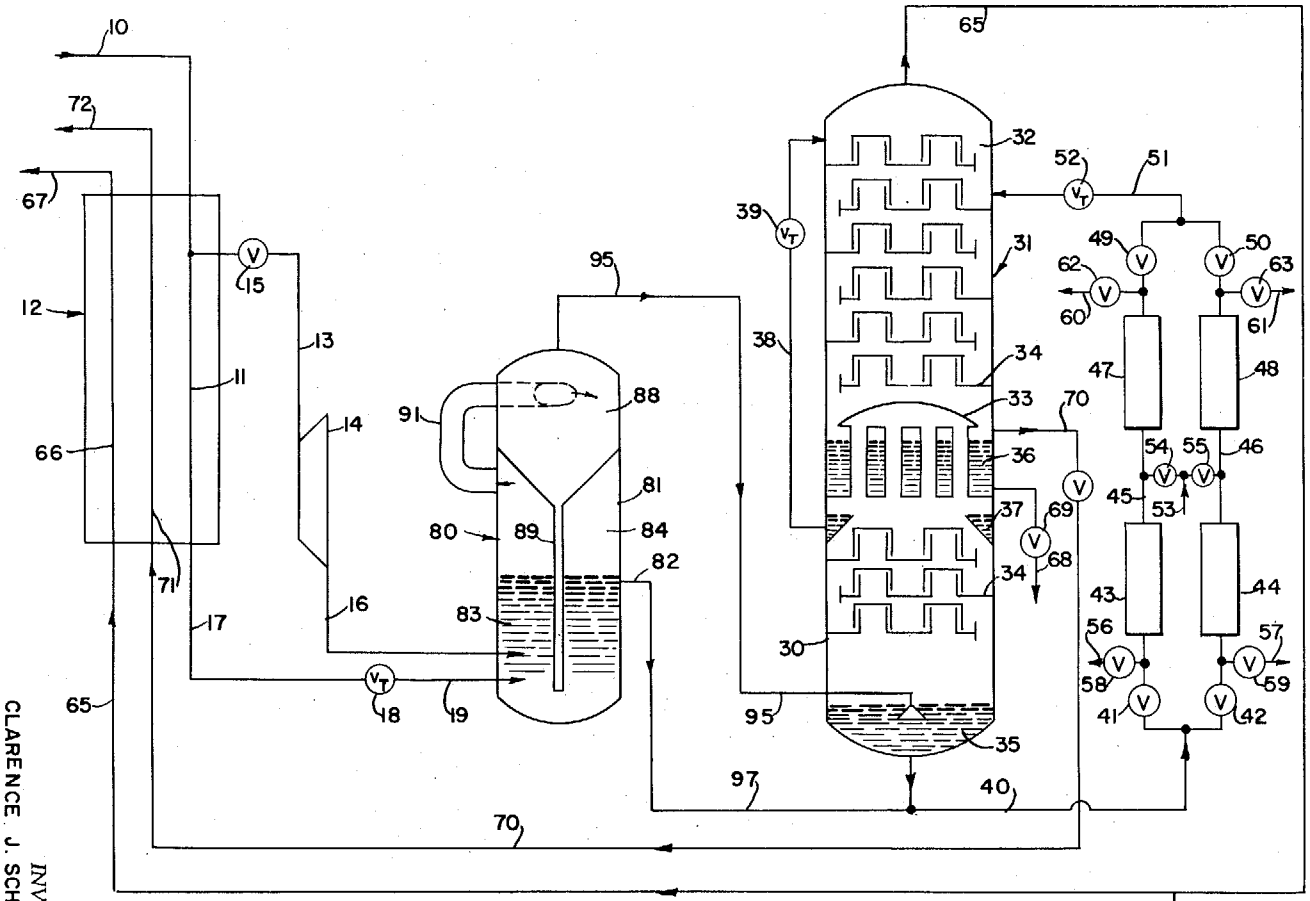
FIGURE 2 is a diagrammatic view of another embodiment of the present invention.
Figure 3:
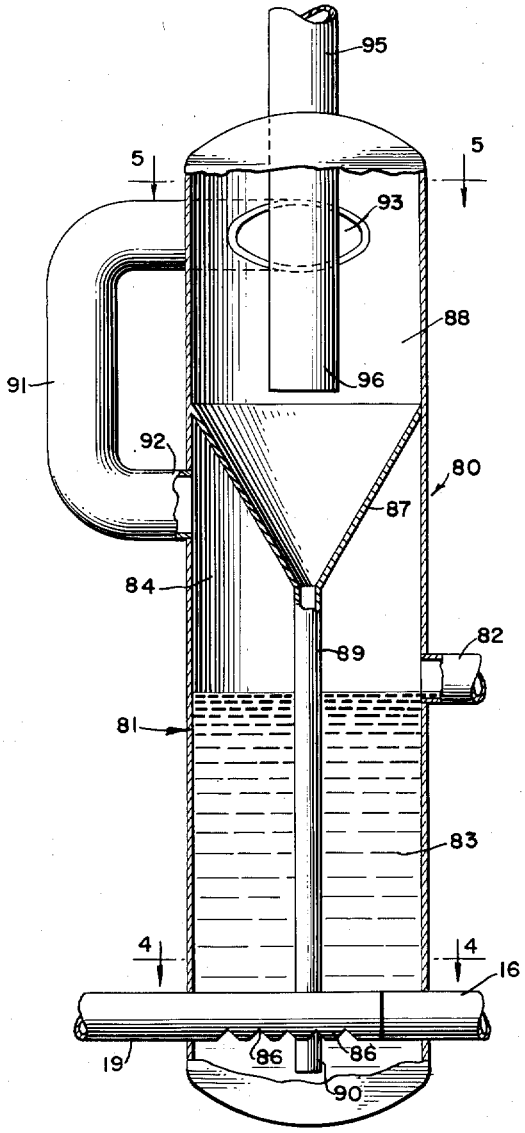
FIGURE 3 is an enlarged view, partially in section, of a device included in the cycle shown in FIGURE 2.
Figure 4:
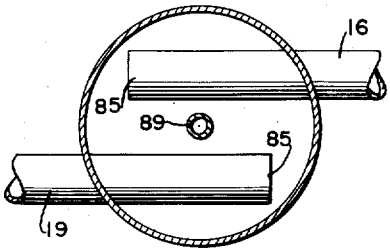
FIGURE 4 is a view in section taken along the line 4—4 of FIGURE 3.
Figure 5:
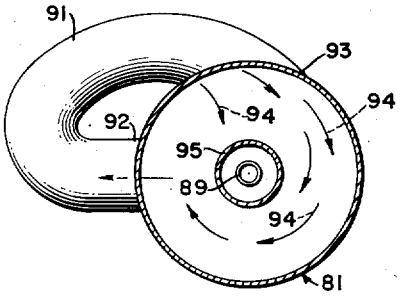
FIGURE 5 is a view in section taken along the line 5—5 of FIGURE 3.

In the embodiment of the invention shown in FIGURE 2 of the drawings, feed mixture introduced into the fractionating column is either in gaseous phase substantially free of high boiling point impurity or is first passed through filter and adsorber zones to remove substantially the total high boiling point impurity therefrom. As shown, superheated feed mixture from the expansion engine 14 including gaseous high boiling point impurity and the remainder of the feed mixture in liquid and vapor phase and containing precipitated and dissolved high boiling point impurity are fed by the conduits 16 and 19 to a conglomerator 80 which functions to separate the feed mixture into a vapor portion substantially free of high boiling point impurity and a liquid portion containing substantially the total high boiling point impurity. With particular reference to FIGURES 3, 4 and 5, the conglomerator 80 may comprise a closed vessel 81 of circular cross-section having a liquid outlet conduit 82 connected to the vessel at an intermediate level to divide the vessel into a lower liquid receiving chamber at 83 and an upper vapor receiving chamber 84. The conduits 16 and 19 entering the base of the vessel may terminate in closed ends 85 and may be provided with a series of openings 86 along their under sides for the discharge of feed mixture therefrom. The upper end of the vapor receiving chamber 84 is defined by a conical wall 87 which also forms the bottom wall of a separating chamber 88 located at the upper end of the vessel. A conduit 89 is joined to the apex of the conical wall 87 and extends downwardly into the liquid receiving chamber 83 and terminates at an end 90 adjacent the bottom of the vessel. The vapor receiving chamber 84 communicates with the separating chamber 88 by a conduit 91 having one end 92 communicating with the vapor receiving chamber and an upper end 93 being tangentially connected to the side wall of the vessel forming the upper portion of the separating chamber. With this construction vapor flows tangentially into the separating chamber and follows circular paths therein as shown by arrows 94 in FIGURE 4. A vapor outlet conduit 95 extends into the upper end of the vessel 81 and downwardly into the separating chamber 88 and terminates therein at end 96 below the discharge end 93 of the conduit 91. In operation, the liquid receiving chamber 83 is filled with liquefied feed mixture and the superheated vapor introduced through the conduit 16 is cooled to effect precipitation of high boiling point impurity. Vapor substantially free of high boiling point impurity is conducted from chamber 84 to the separating chamber wherein entrained liquid is separated and returned to the liquid receiving chamber through the conduit 89. Gaseous mixture in vapor phase and substantially free of high boiling point impurity is discharged from the conglomerator through the conduit 95, and gaseous mixture in liquid phase containing precipitated and dissolved high boiling point impurity flows through the conduit 82.

As shown in FIGURE 2, the conduit 95 feeds the vapor portion of the gaseous mixture into the high pressure section 30, either above the pool 35 of liquid high boiling point fraction or into the pool as shown. The liquid portion of the gaseous mixture is conducted by a conduit 97 and merged with a stream of liquid high boiling point fraction withdrawn from the pool 35 and the combined streams are passed by the conduit 40 through one of the filter-adsorber combinations 43—47 or 44—48, expanded in valve 52 and introduced into the low pressure section 32. In this cycle the vapor portion of the gaseous mixture introduced into the high pressure section by the conduit 95 is substantially free of high boiling point impurity and substantially the total high boiling point impurity introduced into the cycle with the feed mixture flowing through the conduit 10 is removed by the filters 43, 44 and the adsorbers 47, 48.

Figure 6:
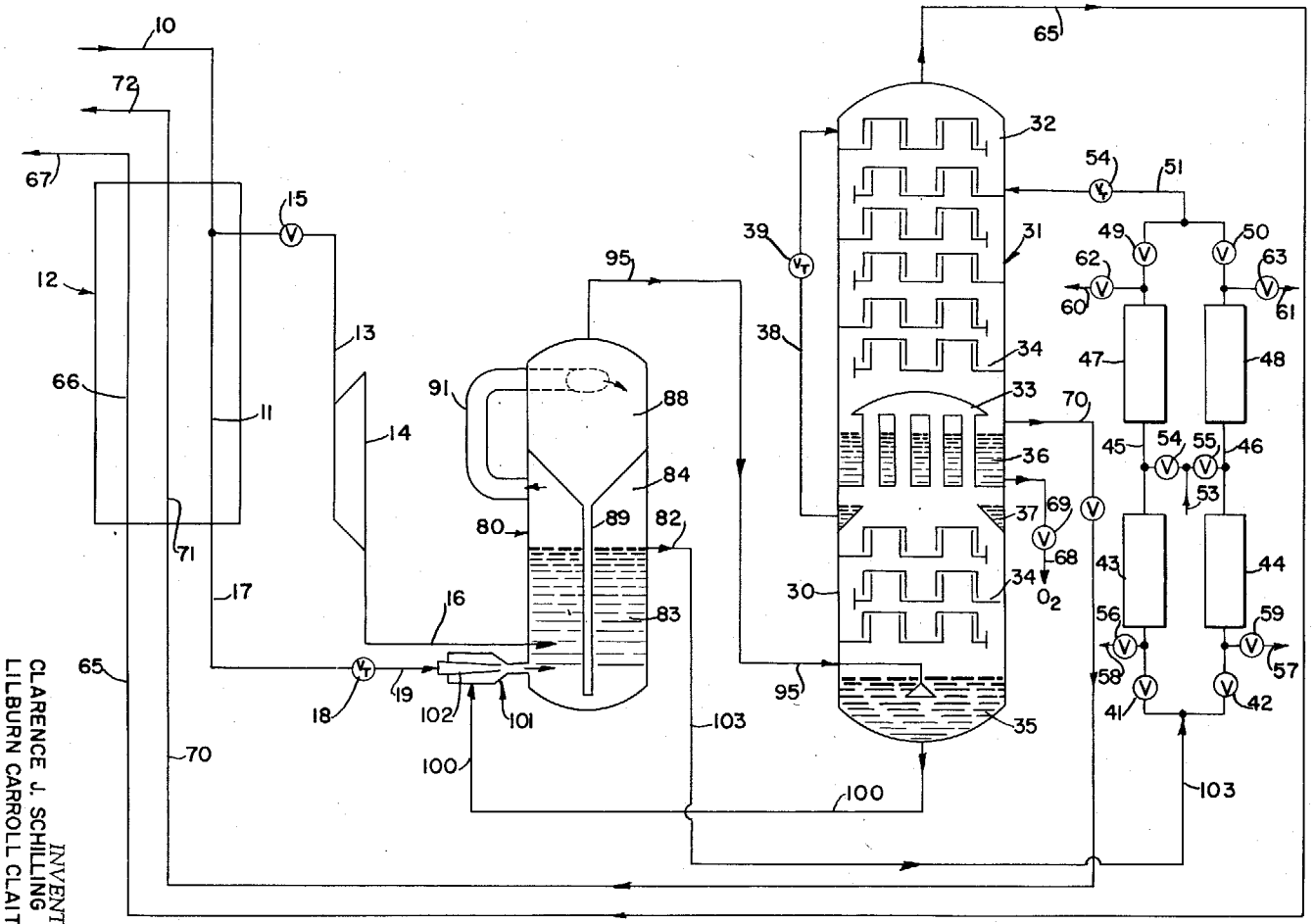
FIGURE 6 is a diagrammatic view of a fractionating cycle constructed in accordance with another embodiment of the present invention.

In the modification of the invention shown in FIGURE 6 of the drawings, an arrangement is provided for utilizing liquid high boiling point fraction from the high pressure section of the column as part of the liquid intermixed with the superheated vapor portion of the gaseous mixture. As shown, a stream of high boiling point liquid fraction is withdrawn from the pool 35 in the base of the high pressure section by conduit 100 and conducted thereby to an injector 101 having its discharge feeding the liquid collecting chamber of the conglomerator 80. Conduit 19 is connected to the nozzle 102 of the injector to provide propellant therefor. The liquid withdrawal conduit 82 of the conglomerator is connected by a conduit 103 to the filters 43 or 44 depending upon the position of switching valves 41 and 42. Gaseous mixture in vapor phase is conducted by the conduit 95 to the high pressure section of the column. In operation of this cycle the liquefied portion of the feed mixture as well as liquid high boiling point fraction withdrawn from the high pressure section of the column is fed to the conglomerator and utilized therein to precipitate high boiling point impurity from the superheated portion of the feed mixture, and the feed for the low pressure section comprises the liquid withdrawn from the conglomerator through the conduit 82.

Figure 7:
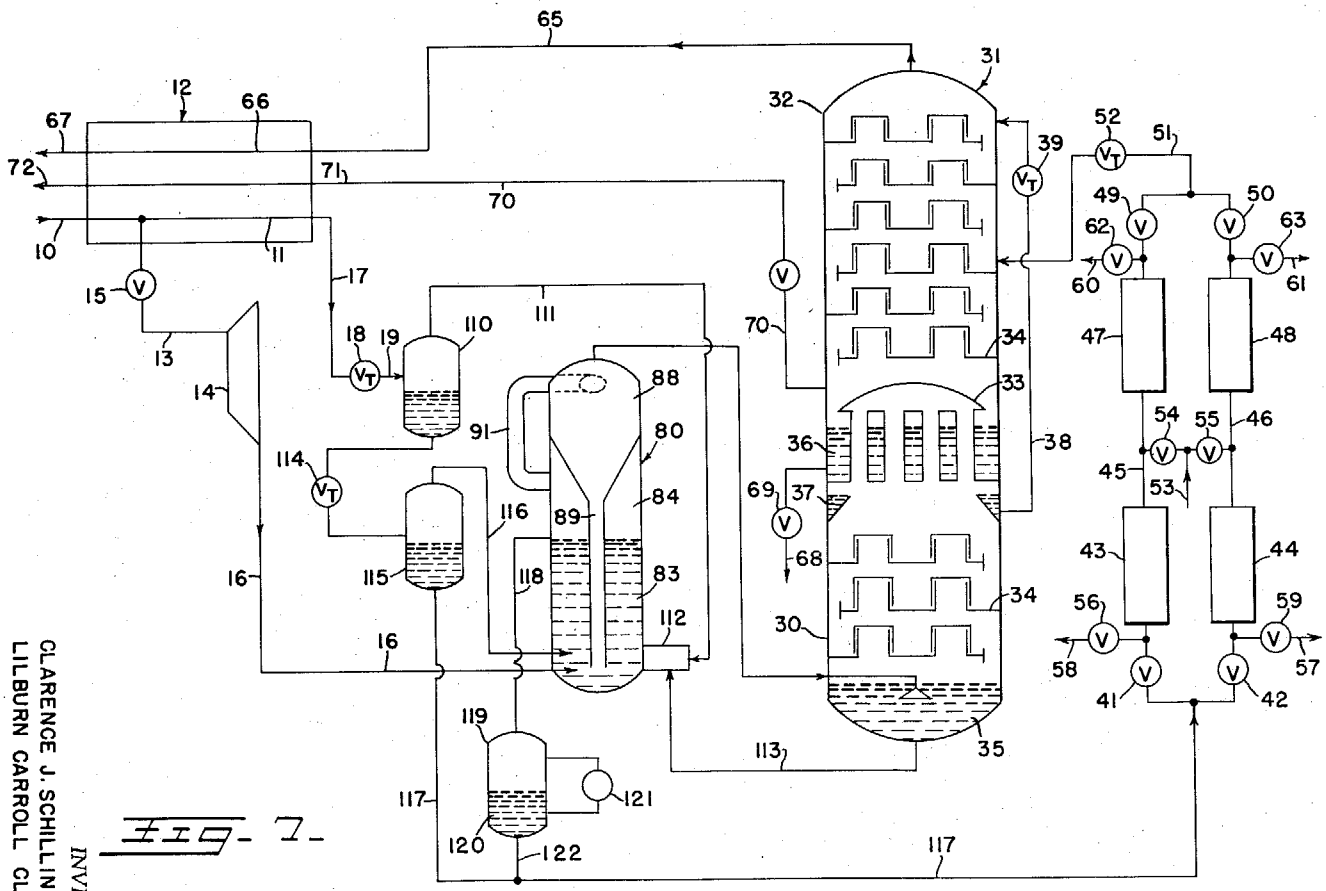
FIGURE 7 is a diagrammatic showing of still another embodiment of the present invention.

In the embodiment of the invention shown in FIGURE 7 of the drawings, the expansion valve 18 functions to expand the feed mixture to an intermediate pressure above the pressure existing in the high pressure section 30, and the effluent from the expansion valve 18 including liquid and vapor is conducted by the conduit 19 to a phase separator 110. Vapor is withdrawn from the separator 110 and fed by conduit 111 to the nozzle of an injector 112 discharging into the bottom of the liquid receiving chamber 83 of the conglomerator 80. A stream of high boiling point fraction is withdrawn from the pool 35 of the high pressure section 30 and conducted by a conduit 113 to the inlet of the injector 112. The injector 112 may be similar to the injector 101 shown in FIGURE 6 and functions to introduce liquid high boiling point fraction into the conglomerator against the head pressure of the liquid in the chamber 83. Flowing through the nozzle of the injector, the stream of vapor at intermediate pressure is expanded to about the pressure existing in the high pressure section 30. Liquid is withdrawn from the separator 110, expanded in a valve 114 to the pressure existing in the high pressure section 30, and introduced into a second phase separator 115. Vapor is withdrawn from the phase separator 115 by conduit 116 and introduced into the conglomerator adjacent the bottom of the liquid receiving chamber 83, while liquid in the phase separator is withdrawn therefrom by a conduit 117 and fed thereby to filters 43 or 44 depending upon the position of switching valves 41 and 42. Liquid is withdrawn from the conglomerator by a conduit 118 and fed to a vessel 119 wherein a pool of liquid 120 is maintained, the vessel may be provided with a device 121 for indicating the level of the liquid therein and the conduit 118 also conducts vapor from the vessel 119 to the conglomerator. Liquid is withdrawn from the vessel by a conduit 122 and is merged with the liquid in the conduit 117 for flow through the filters and adsorbers. Vapor is withdrawn from the dome of the conglomerator by a conduit 123 and introduced into the high pressure section 30 of the fractionating column. The remaining portion of the gaseous feed mixture, which may comprise superheated vapor from the expansion engine 14, is conducted by the conduit 16 and introduced into the conglomerator 80 adjacent the bottom of the liquid receiving chamber 83. In this cycle the portion of the feed mixture in vapor phase, which may comprise effluent from the expansion engine 14 and vapor withdrawn from the phase separators 110 and 115 as shown, is intermixed in the conglomerator with liquid high boiling point fraction from the high pressure section substantially completely free of high boiling point impurity. This performance is obtained since the vapor from the conglomerator in conduit 123 is substantially free of high boiling point impurity and comprises the feed for the high pressure section of the column. The liquefied portion of the feed mixture from the phase separator 115 and liquid withdrawn from the conglomerator including substantially the total high boiling point impurity of the feed mixture in conduits 16 and 116, are merged and passed through filters and adsorbers prior to introduction into the low pressure section 32 as feed. The vessel 119 provides an arrangement for controlling the flow of liquid through the conduit 117 and into the filters and adsorbers.

Figure 8:
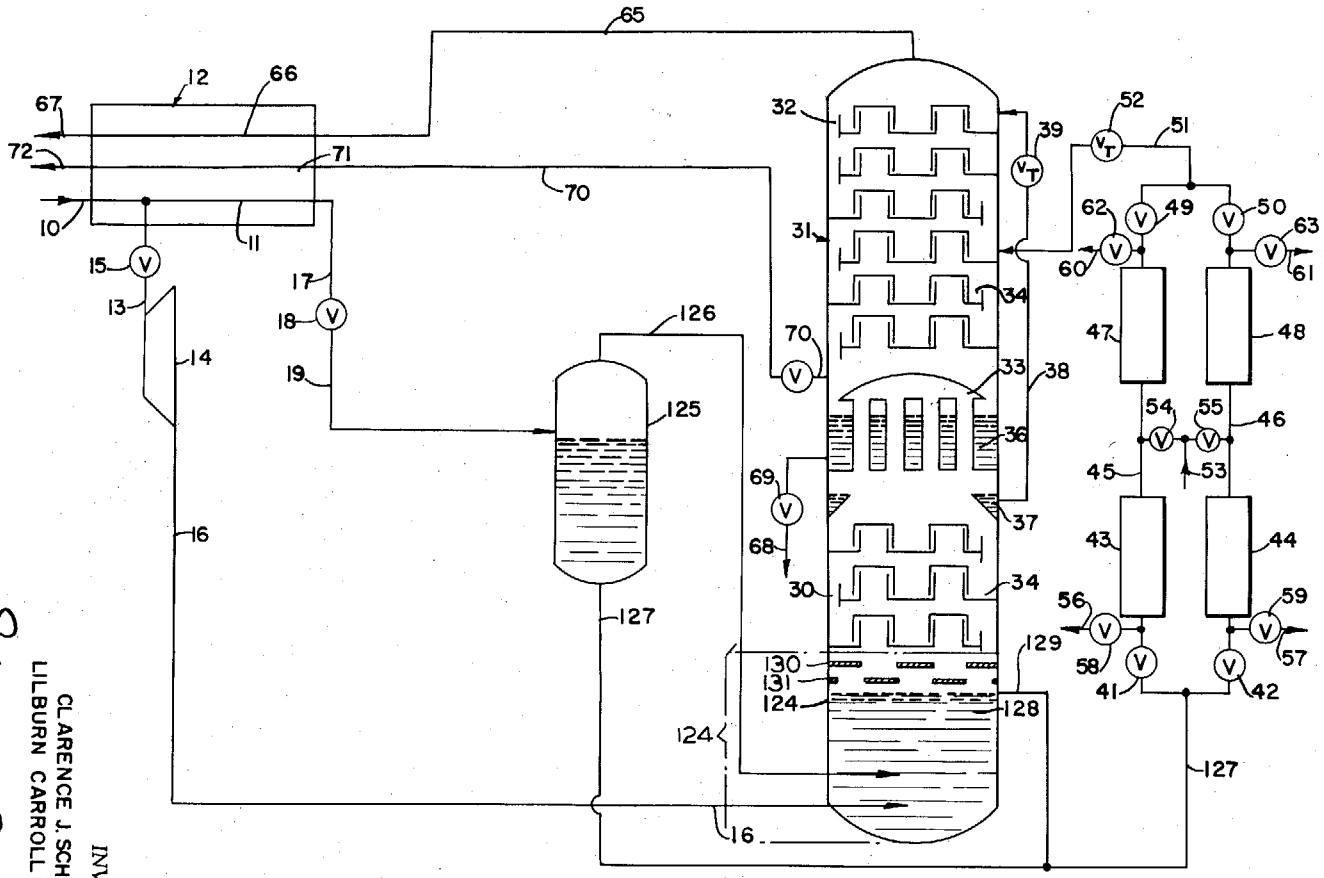
FIGURE 8 is a diagrammatic illustration of a fractionating cycle embodying further features of the present invention.

In the cycle shown in FIGURE 8 of the drawings, the superheated vapor from the expansion engine 14 is conducted by the conduit 16 to an extension 124 of the high pressure section 30. The partly liquefied gaseous mixture downstream of the expansion valve 18 is fed by the conduit 19 to a phase separator 125 having a vapor outlet conduit 126 feeding the extension 124 and a liquid outlet conduit 127 connected to the filters 43 and 44 through the switching valves 41 and 42. The extension 124 of the high pressure section 30 retains a pool 128 of liquid high boiling point fraction, the depth of the pool being determined by the location of a liquid withdrawal conduit 129 connected to the conduit 127. The extension 124 may also include a plurality of trays such as trays 130 and 131 positioned above the pool 128 and below the lowermost tray 34 of the high pressure section 30. The trays 130 and 131 are of the sieve type provided with openings of a diameter larger than the openings in sieve type fractionating trays, such as about one-half inch in diameter for example. In operation of this embodiment, vapor portion of the feed mixture such as superheated vapor from the expansion engine and vapor from the separator 125, is fed into the extension 124 adjacent the bottom of the pool 128 wherein high boiling point impurity is precipitated and concentrated in the liquid high boiling point fraction. Vapor flows upwardly from the pool 128 and through the enlarged openings in the trays 130 and 131 in intimate contact with downwardly flowing liquid. High boiling point impurity that may flow upwardly with the vapor is substantially completely precipitated and deposits around the periphery of the openings in the trays 130 and 131 with the result that vapor entering the high pressure section 30 is substantially completely free of high boiling point impurity. High boiling point impurity deposits are dissolved by liquid flowing downwardly through the openings of the trays 130 and 131 and substantially the total high boiling point impurity of the vapor portion of the feed mixture is concentrated in the liquid of the pool 128. Liquid gaseous mixture from the separator 125, containing precipitated and dissolved high boiling point impurity, and liquid withdrawn from the pool 128, also containing precipitated and dissolved high boiling point impurity, are merged, passed through one of the filter-adsorber combinations and fed, substantially free of high boiling point impurity, into the low pressure section wherein the separation is completed producing liquid high boiling point component and gaseous low boiling point component. If desired the extension 124 may comprise a separate vessel unattached to the fractionating column except for conduits conducting liquid from the bottom of the high pressure section to the top of the extension and vapor from the top of the extension to the bottom of the high pressure section. When it is not possible to transfer liquid under the influence of gravity a transfer pump may be employed or an ejector system similar to the arrangement of FIGURE 7 may be used. In the latter case, the ejector 112 could be located adjacent the upper end of the extension to discharge liquid therein above the trays 130 and 131.

While the various embodiments of the invention have been described in the environment of a fractionating operation in which a portion of the feed mixture may be at a temperature within the superheat region, it will be appreciated that certain novel features of the present invention provide unobvious advantages in aiding in the removal of high boiling point impurities from feed mixtures which may be below the superheat regon such as at saturation temperature. For example, in the embodiment of the invention shown in FIGURE 7, when product is not withdrawn in liquid phase adequate refrigeration may be obtained without the expansion engine 14 and the valve 15 may be closed to pass the total feed mixture through the heat exchange device 12. In such case, the vapor portions of the feed mixture from the phase separators 110 and 115 are intermixed with liquid high boiling point fraction in the conglomerator providing gaseous mixture in vapor phase from the conglomerator substantially completely free of high boiling point impurity which comprises the feed for the high pressure section. Thus the invention provides an arrangement for obtaining more complete removal of high boiling point impurity from the feed mixture in vapor phase by separating the liquid and vapor phase of the feed mixture and then mixing the vapor portion with a liquid substantially free of high boiling point impurity, which liquid may include components of the feed mixture. Moreover, although the cycles disclosed and described above are of the type in which substantially the total high boiling point impurity in the feed mixture is removed from the cycle by means of filters and adsorbers, it is to be expressly understood that the principles of the present invention may be employed with cycles including switching heat exhange zones for removing the major portion of high boiling point impurities from the feed mixture. In cycles employing switching heat exchange zones, particles of precipitated high boiling point impurity become entrained in the feed mixture and are passed into the cycle downstream of the heat exchange zones and collect in a cold portion of the cycle requiring eventual defrosting. By treating the cold feed mixture downstream of the heat exchange zones in accordance with the principles of the present invention the total high boiling point impurities may be substantially completely removed from the cycle.

Although several embodiments of the present invention have been disclosed and described herein, it is to be expressly understood that various changes and substitutions may be made therein without departing from the spirit of the invention as well understood by those skilled in the art. For example, although the invention has been described in the environment of separation of air it is to be expressly understood that the invention may be employed in fractionating cycles designed for separating other gaseous mixtures. In addition, although in each of the disclosed cycles the expansion engine is fed with a side stream of gaseous feed mixture it is within the scope of the present invention to feed the expansion engine with a separate stream of gaseous mixture under a pressure different from the pressure of the remaining portion of the feed mixture. Reference therefore will be had to the appended claims for a definition of the limits of the invention.

What is claimed is:

1. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing liquid high boiling point fraction and gaseous low boiling point fraction and in which liquid high boiling point fraction is fed to a low pressure fractionating zone wherein the separation is continued producing liquid high boiling point product and gaseous low boiling point product, which method comprises providing a stream of compressed gaseous mixture and passing the stream of compressed gaseous mixture in heat exchange effecting relation with cold product of the operation to cool the stream of gaseous mixture to a relatively low predetermined temperature such that liquid will not form in an ensuing expansion step, expanding the cool stream of gaseous mixture to a relatively low pressure and further cooling the gaseous mixture within the superheat region, providing liquid material including components of the gaseous mixture, intermixing the stream of expanded gaseous mixture with the liquid material to cool the expanded gaseous mixture to at least [its saturation] *the precipitation* temperature *of the high boiling point impurity* at the existing pressure and separating the resulting intermixture to provide a [saturated] vapor portion and a liquid portion, feeding [saturated] vapor portion to the high pressure fractionating zone, forming a fluid stream including the liquid portion of the intermixture and substantially the total high boiling point impurity of the stream of gaseous mixture, and passing the fluid stream through filter and adsorber zones and then to the low pressure fractionating zone, the fluid stream including the total liquid high boiling point fraction fed to the low pressure fractionating zone.

2. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing liquid high boiling point fraction and gaseous low boiling point fraction and in which liquid high boiling point fraction is fed to a low pressure fractionating zone wherein the separation is continued producing liquid high boiling point product and gaseous low boiling point product, which method comprises providing a stream of compressed gaseous mixture and passing the stream of compressed gaseous mixture in heat exchange effecting relation with cold product of the operation to cool the stream of gaseous mixture to a relatively low predetermined temperature such that liquid will not form in an ensuing expansion step, expanding the cool stream of gaseous mixture to a relatively low pressure and further cooling the gaseous mixture within the superheat region, providing liquid material including components of the gaseous mixture, intermixing the stream of expanded gaseous mixture with the liquid material to cool the expanded gaseous mixture to at least [its saturation] *the precipitation* temperature *of the high boiling point impurity* at the existing pressure and separating the resulting intermixture to provide a [saturated] vapor portion and a liquid portion, feeding [saturated] vapor portion to the high pressure fractionating zone, forming a fluid stream consisting of the liquid portion of the intermixture and liquid high boiling point fraction withdrawn from the high pressure fractionating zone, and passing the fluid stream through filter and adsorber zones and then to the low pressure fractionating zone, the liquid high boiling point fraction of the fluid stream comprising the total liquid high boiling point fraction fed to the low pressure fractionating zone.

3. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid high boiling point product and gaseous low boiling point product, which method comprises providing a first stream of compressed gaseous mixture and passing the first stream of compressed gaseous mixture in heat exchange effecting relation with product of the operation to cool the first stream of gaseous mixture to a relatively low predetermined temperature such that liquid will not form in an ensuing expansion step, expanding the cool first stream of gaseous mixture to a relatively low pressure and further cooling the stream to within the superheat region, providing a second stream of compressed gaseous mixture and passing the second stream of compressed gaseous mixture in heat exchange effecting relation with product of the operation to cool the second stream of gaseous mixture to a temperature lower than the predetermined temperature, expanding the cool second stream of gaseous mixture to the relatively low pressure and partially liquefying the second stream, intermixing the expanded first stream of gaseous mixture and the expanded second stream of gaseous mixture to cool the first stream of gaseous mixture to at least [its saturation] *the precipitation* temperature *of the high boiling point impurity* at the existing pressure and separating the resulting intermixture to provide a [saturated] vapor portion and a liquid portion, feeding the [saturated] vapor portion to the high pressure fractionating zone, conducting the liquid portion and liquid high boiling point fraction from the high pressure fractionating zone through filter and adsorber zones and then to the low pressure fractionating zone, the liquid high boiling point fraction fed to the filter and adsorber zones comprising the total liquid high boilling point fraction fed to the low pressure fractionating zone.

4. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid high boiling point product and gaseous low boiling point product, which method comprises providing a first stream of compressed gaseous mixture and passing the first stream of compressed gaseous mixture in heat exchange effecting relation with product of the operation to cool the first stream of gaseous mixture to a relatively low predetermined temperature such that liquid will not form in an ensuing expansion step, expanding the cool first stream of gaseous mixture to a relatively low pressure and further cooling the stream to within the superheat region, providing a second stream of compressed gaseous mixture and passing the second stream of compressed gaseous mixture in heat exchange effecting relation with product of the operation to cool the second stream of gaseous mixture to a temperature lower than the predetermined temperature, expanding the cool second stream of gaseous mixture to the relatively low pressure and partially liquefying the second stream, intermixing the expanded first stream of gaseous mixture and the expanded second stream of gaseous mixture to cool the first stream of gaseous mixture to at least [its saturation] *the precipitation* temperature *of the high boiling point impurity* at the existing pressure and separating the resulting intermixture to provide a [saturated] vapor portion and a liquid portion, feeding the [saturated] vapor portion and the liquid portion to the high pressure fractionating zone, withdrawing liquid including liquid high boiling point fraction from the high pressure fractionating zone, passing withdrawn liquid through filter and adsorber zones and then to the low pressure fractionating zone, the liquid high boiling point fraction passed through the filter and adsorber zones comprising the total liquid high boiling point fraction passed to the low pressure fractionating zone.

5. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid high boiling point product and gaseous low boiling point product, which method comprises providing a first stream of compressed gaseous mixture and passing the first stream of compressed gaseous mixture in heat exchange effecting relation with product of the operation to cool the first stream of gaseous mixture to a relatively low predetermined temperature such that liquid will not form in an ensuing expansion step, expanding the cool first stream of gaseous mixture to a relatively low pressure and further cooling the stream to within the superheat region, providing a second stream of compressed gaseous mixture and passing the second stream of compressed gaseous mixture in heat exchange effecting relation with product of the operation to cool the second stream of gaseous mixture to a temperature lower than the predetermined temperature, expanding the cool second stream of gaseous mixture to the relatively low pressure and partially liquefying the second stream, intermixing the expanded first stream of gaseous mixture and the expanded second stream of gaseous mixture to cool the first stream of gaseous mixture to at least [its saturation] *the precipitation* temperature *of the high boiling point impurity* at the existing pressure and separating the resulting intermixture to provide a [saturated] vapor portion and a liquid portion, feeding the [saturated] vapor portion of the high pressure fractionating zone, withdrawing liquid high boiling point fraction from the high pressure fractionating zone, combining withdrawn liquid high boiling point fraction and the liquid portion of the intermixture to form a composite stream, and passing the composite stream through filter and adsorber zones and then to the low pressure fractionating zone.

6. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing liquid high boiling point fraction and gaseous low boiling point fraction and in which liquid high boiling point fraction is fed to a low pressure fractionating zone wherein the separation is continued producing liquid high boiling point product and gaseous low boiling point product, which method comprises providing a stream of compressed gaseous mixture and passing the stream of compressed gaseous mixture in heat exchange effecting relation with cold product of the operation to cool the stream of gaseous mixture to a relatively low predetermined temperature such that liquid will not form in an ensuing expansion step, expanding the cool stream of gaseous mixture to a relatively low pressure and further cooling the gaseous mixture within the superheat region, intermixing the stream of expanded gaseous mixture with liquid high boiling point fraction to cool the expanded gaseous mixture to at least [its saturation] *the precipitation* temperature *of the high boiling point impurity* at the existing pressure and separating the resulting intermixture to provide a [saturated] vapor portion and a liquid portion, feeding [saturated] vapor portion to the high pressure fractionating zone, and passing the liquid portion through filter and adsorber zones and then to the low pressure fractionating zone.

7. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid high boiling point product and gaseous low boiling point product, which method comprises providing a first stream of compressed gaseous mixture and passing the first stream of compressed gaseous mixture in heat exchange effecting relation with product of the operation to cool the first stream of gaseous mixture to a relatively low predetermined temperature such that liquid will not form in an ensuing expansion step, expanding the cool first stream of gaseous mixture to a relatively low pressure and further cooling the stream to within the superheat region, providing a second stream of compressed gaseous mixture and passing the second stream of compressed gaseous mixture in heat exchange effecting relation with product of the operation to cool the second stream of gaseous mixture to a temperature lower than the predetermined temperature, expanding the cool second stream of gaseous mixture to the relatively low pressure and partially liquefying the second stream, separating the expanded second stream into a vapor portion and a liquid portion, intermixing the vapor portion of the expanded second stream and the expanded first stream with liquid high boiling point fraction to cool the first stream of expanded gaseous mixture to at least [its saturation] *the precipitation* temperature *of the high boiling point impurity* at the existing pressure and separating the resulting intermixture to provide a [saturated] vapor portion and a liquid portion, feeding the [saturated] vapor portion to the high pressure fractionating zone, and passing the liquid portion of the second stream of gaseous mixture and the liquid portion of the intermixture through filter and adsorber zones and then to the low pressure fractionating zone.

8. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid high boiling point product and gaseous low boiling point product, which method comprises providing a first stream of compressed gaseous mixture and passing the first stream of compressed gaseous mixture in heat exchange effecting relation with product of the operation to cool the first stream of gaseous mixture to a relatively low predetermined temperature such that liquid will not form in an ensuing expansion step, expanding the cool first stream of gaseous mixture to a relatively low pressure and further cooling the stream to within the superheat region, providing a second stream of compressed gaseous mixture and passing the second stream of compressed gaseous mixture in heat exchange effecting relation with product of the operation to cool the second stream of gaseous mixture to a temperature lower than the predetermined temperature, expanding the cool second stream of gaseous mixture to the relatively low pressure and partially liquefying the second stream, intermixing the first stream of expanded gaseous mixture with gaseous mixture of the second stream of expanded gaseous mixture and liquid high boiling point fraction to cool the first stream of expanded gaseous mixture to at least [its saturation] *the precipitation* temperature *of the high boiling point impurity* at the existing pressure and separating the resulting intermixture to provide a [saturated] vapor portion and a liquid portion, feeding the [saturated] vapor portion to the high pressure fractionating zone, and conducting the liquid portion through filter and adsorber zones and then to the low pressure fractionating zone.

9. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid high boiling point product and gaseous low boiling point product, which method comprises providing a first stream of compressed gaseous mixture and passing the first stream of compressed gaseous mixture in heat exchange effecting relation with product of the operation to cool the first stream of gaseous mixture to a relatively low predetermined temperature such that liquid will not form in an ensuing expansion step, expanding the cool first stream of gaseous mixture to a relatively low pressure and further cooling the stream to within the superheat region, providing a second stream of compressed gaseous mixture and passing the second stream of compressed gaseous mixture in heat exchange effecting relation with product of the operation to cool the second stream of gaseous mixture to a temperature lower than the predetermined temperature, expanding the cool second stream of gaseous mixture to the relatively low pressure and partially liquefying the second stream, intermixing the first stream of expanded gaseous mixture with the second stream of expanded gaseous mixture and liquid high boiling point fraction to cool the first stream of expanded gaseous mixture to at least [its saturation] *the precipitation* temperature *of the high boiling point impurity* at the existing pressure and separating the resulting intermixture to provide a [saturated] vapor portion and a liquid portion, feeding the [saturated] vapor portion to the high pressure fractionating zone, and conducting the liquid portion through filter and adsorber zones and then to the low pressure fractionating zone, the liquid high boiling point fraction of the intermixture comprising the total high boiling point fraction fed to the low pressure fractionating zone.

10. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing liquid high boiling point fraction and gaseous low boiling point fraction and in which liquid high boiling point fraction is fed to a low pressure fractionating zone wherein the separation is continued producing liquid high boiling point product and gaseous low boiling point product, which method comprises providing a stream of compressed gaseous mixture and passing the stream of compressed gaseous mixture in heat exchange effecting relation with cold product of the operation to cool the stream of gaseous mixture to a relatively low predetermined temperature such that liquid will not form in an ensuing expansion step, expanding the cool stream of gaseous mixture to a relatively low pressure and further cooling the gaseous mixture within the superheat region, passing the stream of expanded gaseous mixture to an intermixing zone, employing energy of the expanded gaseous mixture to conduct liquid high boiling point fraction from the high pressure fractionating zone to the intermixing zone to cool the expanded gaseous mixture to a least [its saturation] *the precipitation* temperature *of the high boiling point impurity* at the existing pressure, withdrawing [saturated] vapor from the intermixing zone and feeding [saturated] vapor to the high pressure fractionating zone, withdrawing liquid from the intermixing zone and passing the liquid through filter and adsorber zones and then to the low pressure fractionating zone.

11. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid high boiling point product and gaseous low boiling point product, which method comprises providing a first stream of compressed gaseous mixture and passing the first stream of compressed gaseous mixture in heat exchange effecting relation with product of the operation to cool the first stream of gaseous mixture to a relatively low predetermined temperature such that liquid will not form in an ensuing expansion step, expanding the cool first stream of gaseous mixture to a relatively low pressure and further cooling the stream to within the superheat region, providing a second stream of compressed gaseous mixture and passing the second stream of compressed gaseous mixture in heat exchange effecting relation with product of the operation to cool the second stream of gaseous mixture to a temperature lower than the predetermined temperature, expanding the cool second stream of gaseous mixture to the relatively low pressure and partially liquefying the second stream, feeding expanded first stream of gaseous mixture and expanded second stream of gaseous mixture to an intermixing zone, utilizing energy of the expanded second stream of gaseous mixture to conduct liquid high boiling point fraction from the high pressure fractionating zone to the intermixing zone, withdrawing [saturated] vapor from the intermixing zone and feeding the [saturated] vapor to the high pressure fractionating zone, withdrawing liquid from the intermixing zone and conducting such liquid through filter and adsorber zones and then to the low pressure fractionating zone.

12. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid high boiling point product and gaseous low boiling point product, which method comprises providing a first stream of compressed gaseous mixture and passing the first stream of compressed gaseous mixture in heat exchange effecting relation with product of the operation to cool the first stream of gaseous mixture to a relatively low predetermined temperature such that liquid will not form in an ensuing expansion step, expanding the cool first stream of gaseous mixture to a relatively low pressure and further cooling the stream to within the superheat region, providing a second stream of compressed gaseous mixture and passing the second stream of compressed gaseous mixture in heat exchange effecting relation with product of the operation to cool the second stream of gaseous mixture to a temperature lower than the predetermined temperature, expanding the cool second stream of gaseous mixture to an intermediate pressure above the relatively low pressure and partially liquefying the second stream, separating the expanded second stream into an intermediate pressure vapor portion and an intermediate pressure liquid portion, expanding the intermediate pressure liquid portion to the relatively low pressure and separating the expanded intermediate pressure liquid portion into a low pressure vapor portion and a low pressure liquid portion, intermixing the intermediate pressure vapor portion and the low pressure vapor portion of the expanded second stream and the expanded first stream with liquid high boiling point fraction to cool the first stream of expanded gaseous mixture to at least [its saturation] *the precipitation* temperature *of the high boiling point impurity* at the existing pressure and separating the resulting intermixture to provide a [saturated] vapor portion and a liquid portion, feeding the [saturated] vapor portion to the high pressure fractionating zone, passing the low pressure liquid portion and the liquid portion of the intermixture through filter and adsorber zones and then to the low pressure fractionating zone.

13. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid high boiling point product and gaseous low boiling point product, which method comprises providing a first stream of compressed gaseous mixture and passing the first stream of compressed gaseous mixture in heat exchange effecting relation with product of the operation to cool the first stream of gaseous mixture to a relatively low predetermined temperature such that liquid will not form in an ensuring expansion step, expanding the cool first stream of gaseous mixture to a relatively low pressure and further cooling the stream to within the superheat region, providing a second stream of compressed gaseous mixture and passing the second stream of compressed gaseous mixture in heat exchange effecting relation with product of the operation to cool the second stream of gaseous mixture to a temperature lower than the predetermined temperature, expanding the cool second stream of gaseous mixture to an intermediate pressure above the relatively low pressure and partially liquefying the second stream, separating the expanded second stream into an intermediate pressure vapor portion and an intermediate pressure liquid portion, expanding the intermediate pressure liquid portion to the relatively low pressure and separating the expanded intermediate pressure liquid portion into a low pressure vapor portion and a low pressure liquid portion, feeding the intermediate pressure vapor portion and the low pressure vapor portion of the expanded second stream and the expanded first stream to an intermixing zone and utilizing energy of expanded gaseous mixture to conduct liquid high boiling point fraction from the high pressure fractionating zone to the intermixing zone, withdrawing [saturated] vapor from the intermixing zone and feeding such [saturated] vapor to the high pressure fractionating zone, withdrawing liquid from the intermixing zone and conducting such liquid and the low pressure liquid portion through filter and adsorber zones and then to the low pressure fractionating zone.

14. Method of separating in a low temperature fractionating operation components of gaseous mixtures including high boiling point impurity, in which operation compressed and cooled gaseous mixture is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid high boiling point product and gaseous low boiling point product, which method comprises providing a first stream of compressed gaseous mixture and passing the first stream of compressed gaseous mixture in heat exchange effecting relation with product of the operation to cool the first stream of gaseous mixture to a relatively low predetermined temperature such that liquid will not form in an ensuing expansion step, expanding the cool first stream of gaseous mixture to a relatively low pressure and further cooling the stream to within the superheat region, providing a second stream of compressed gaseous mixture and passing the second stream of compressed gaseous mixture in heat exchange effecting relation with product of the operation to cool the second stream of gaseous mixture to a temperature lower than the predetermined temperature, expanding the cool second stream of gaseous mixture to the relatively low pressure and partially liquefying the second stream, separating the expanded second stream into a vapor portion and a liquid portion, passing the vapor portion of the expanded second stream and the expanded first stream with liquid high boiling point fraction to a liquid receiving zone in vapor communication with the high pressure fractionating zone to intermix the vapor portion and the second stream of gaseous mixture with liquid in the liquid receiving zone, withdrawing liquid from the liquid receiving zone, passing liquid withdrawn from the liquid receiving zone and the liquid portion of the second stream of gaseous mixture through filter and adsorber zones and then to the low pressure fractionating zone.

15. Method of separating air in a low temperature fractionating operation to produce liquid oxygen product, in which operation compressed and cooled air is fed to a high pressure fractionating zone wherein the mixture undergoes preliminary separation producing liquid high boiling point fraction and gaseous low boiling point fraction and in which liquid high boiling point fraction is fed to a low pressure fractionating zone wherein the separation is continued producing liquid oxygen product and gaseous low boiling point product, which method comprises providing a stream of compressed air and passing the stream of compressed air in heat exchange effecting relation with gaseous low boiling point product of the operation to cool the stream of air to a relatively low predetermined temperature such that liquid will not form in an ensuing expansion step, work expanding the cool stream of air to a relatively low pressure and further cooling the gaseous mixture within the superheat region, providing liquid material including components of air, intermixing the stream of expanded air with the liquid material to cool the expanded air to at least [its saturation] *the precipitation* temperature *of the high boiling point impurity* at the existing pressure and separating the resulting intermixture to provide a [saturated] vapor portion and a liquid portion, feeding [saturated] vapor portion to the high pressure fractionating zone, forming a fluid stream including substantially the high boiling point impurity of the air and passing the fluid stream through filter and adsorber zones and then to the low pressure fractionating zone, the fluid stream including the total liquid high boiling point fraction fed to the low pressure fractionating zone, and withdrawing liquid oxygen from the low pressure fractionating zone.

16. Method of separating air in a low temperature fractionating operation to produce liquid oxygen, in which operation compressed and cooled air is fed to a high pressure fractionating zone wherein the mixture undergoes preliminary separation producing a liquid high boiling point fraction and a gaseous low boiling point fraction and in which liquid high boiling point fraction is fed to a low pressure fractionating zone wherein the separation is continued producing liquid oxygen product and gaseous low boiling point product, which method comprises providing a first stream of compressed air and passing the first stream of compressed air in heat exchange effecting relation with gaseous low boiling point product of the operation to cool the first stream of air to a relatively low predetermined temperature such that liquid will not form in an ensuing expansion step, work expanding the cool first stream of air to a relatively low pressure and further cooling the air to within the superheat region, providing a second stream of compressed air and passing the second stream of compressed air in heat exchange effecting relation with gaseous low boiling point product of the operation to cool the second stream of air to a temperature lower than the predetermined temperature, expanding the cool second stream of air to the relatively low pressure and partially liquefying the second stream, intermixing the first stream of expanded air with at least a portion of the second stream of expanded air and liquid high boiling point fraction to cool the first stream of expanded air to at least [its saturation] *the precipitation* temperature *of the high boiling point impurity* at the existing pressure and separating the resulting intermixture to provide a [saturated] vapor portion and a liquid portion, feeding the [saturated] vapor portion to the high pressure fractionating zone, and conducting the liquid portion through filter and adsorber zones and then to the low pressure fractionating zone.

17. Apparatus for separating components of gaseous mixtures comprising a two-stage fractionating column including a high pressure fractionating zone wherein the mixture undergoes preliminary separation producing liquid high boiling point fraction and gaseous low boiling point fraction and a low pressure fractionating zone wherein the separation is continued producing liquid high boiling point product and gaseous low boiling point product, means providing a stream of compressed gaseous mixture and passing the stream of compressed gaseous mixture in heat exchange effecting relation with cold product of the fractionating column to cool the stream of gaseous mixture to a relatively low predetermined temperature such that liquid will not form in an ensuing expansion step, a work expansion engine for expanding the cool stream of gaseous mixture to a relatively low pressure and further cooling the gaseous mixture within the superheat region, means providing liquid material including components of the gaseous mixture, means intermixing the stream of expanded gaseous mixture with the liquid material to cool the expanded gaseous mixture to at least [its saturation] *the precipitation* temperature *of the high boiling point impurity* at the existing pressure and separating the resulting intermixture to provide a [saturated] vapor portion of a liquid portion, means feeding [saturated] vapor portion to the high pressure fractionating zone, means forming a fluid stream including substantially the high boiling point impurity of the gaseous mixture, and means passing the fluid stream through filter means and adsorber means and then to the low pressure fractionating zone, the fluid stream including the total liquid high boiling point fraction fed to the low pressure fractionating zone.

18. Apparatus for separating components of gaseous mixtures comprising a two-stage fractionating column including a high pressure fractionating zone wherein the mixture undergoes preliminary separation producing liquid high boiling point fraction and gaseous low boiling point fraction and a low pressure fractionating zone wherein the separation is continued producing liquid high boiling point product and gaseous low boiling point product, means providing a stream of compressed gaseous mixture and passing the stream of compressed gaseous mixture in heat exchange effecting relation with cold product for the fractionating column to cool the stream of gaseous mixture to a relatively low predetermined temperature such that liquid will not form in an ensuing expansion step, a work expansion engine for expanding the cool stream of gaseous mixture to a relatively low pressure and further cooling the gaseous mixture within the superheat region, means intermixing the stream of expanded gaseous mixture with liquid high boiling point fraction to cool the expanded gaseous mixture to at least [its saturation] *the precipitation* temperature *of the high boiling point impurity* at the existing pressure and separating the resulting intermixture to provide a [saturated] vapor portion and a liquid portion, means feeding [saturated] vapor portion to the high pressure fractionating zone, and means passing the liquid portion through filter means and adsorber means and then to the low pressure fractionating zone.

19. Apparatus for separating components of gaseous mixtures comprising a two-stage fractionating column including a high pressure fractionating zone wherein the mixture undergoes preliminary separation producing a liquid high boiling point fraction and gaseous low boiling point fraction and a low pressure fractionating zone wherein the separation is continued producing liquid high boiling point product and gaseous low boiling point product, means providing a first stream of compressed gaseous mixture and passing the first stream of compressed gaseous mixture in heat exchange effecting relation with product of the fractionating column to cool the first stream of gaseous mixture to a relatively low predetermined temperature such that liquid will not form in an ensuing expansion step, a work expansion engine for expanding the cool first stream of gaseous mixture to a relatively low pressure and further cooling the stream to within the superheat region, means providing a second stream of compressed gaseous mixture and passing the second stream of compressed gaseous mixture in heat exchange effecting relation with product of the fractionating column to cool the second stream of gaseous mixture to a temperature lower than the predetermined temperature, means expanding the cool second stream of gaseous mixture to the relatively low pressure and partially liquefying the second stream, means intermixing the expanded first stream of gaseous mixture and the expanded second stream of gaseous mixture to cool the first stream of gaseous mixture to at least [its saturation] *the precipitation* temperature *of the high boiling point impurity* at the existing pressure and separating the resulting intermixture to provide a [saturated] vapor portion and a liquid portion, means feeding the [saturated] vapor portion to the high pressure fractionating zone, and means conducting the liquid portion and liquid high boiling point fraction from the high pressure fractionating zone through filter means and adsorber means and then to the low pressure fractionating zone.

20. Apparatus for separating components of gaseous mixtures comprising a two-stage fractionating column including a high pressure fractionating zone wherein the mixture undergoes preliminary separation producing a liquid high boiling point fraction and gaseous low boiling point fraction and a low pressure fractionating zone wherein the separation is continued producing liquid high boiling point product and gaseous low boiling point product, means providing a first stream of compressed gaseous mixture and passing the first stream of compressed gaseous mixture in heat exchange effecting relation with cold product of the fractionating column to cool the first stream of gaseous mixture to a relatively low predetermined temperature such that liquid will not form in an ensuing expansion step, a work expansion engine for expanding the cool first stream of gaseous mixture to a relatively low pressure and further cooling the stream to within the superheat region, means providing a second stream of compressed gaseous mixture and passing the second stream of compressed gaseous mixture in heat exchange effecting relation with product of the fractionating column to cool the second stream of gaseous mixture to a temperature lower than the predetermined temperature, means expanding the cool second stream of gaseous mixture to the relatively low pressure and partially liquefying the second stream, means intermixing the first stream of expanded gaseous mixture with the liquid portion of the second stream of expanded gaseous mixture and liquid high boiling point fraction to cool the first stream of expanded gaseous mixture to at least [its saturation] *the precipitation* temperature *of the high boiling point impurity* at the existing pressure and separating the resulting intermixture to provide a [saturated] vapor portion and a liquid portion, means feeding the [saturated] vapor portion to the high pressure fractionating zone, and means conducting the liquid portion through filter means and adsorber means and then to the low pressure fractionating zone.

21. Apparatus for separating components of gaseous mixtures comprising a two-stage fractionating column including a high pressure fractioning zone wherein the mixture undergoes preliminary separation producing a liquid high boiling point fraction and a gaseous low boiling point fraction and a low pressure fractioning zone wherein the separation is continued producing liquid high boiling point product and gaseous low boiling point product, means providing a first stream of compressed gaseous mixture and passing the first stream of compressed gaseous mixture in heat exchange effecting relation with product of the fractionating column to cool the first stream of gaseous mixture to a relatively low predetermined temperature such that liquid will not form in an ensuing expansion step, a work expansion engine for expanding the cool first stream of gaseous mixture to a relatively low pressure and further cooling the stream to within the superheat region, means providing a second stream of compressed gaseous mixture and passing the second stream of compressed gaseous mixture in heat exchange effecting relation with product of the fractioning column to cool the second stream of gaseous mixture to a temperature lower than the predetermined temperature, means expanding the cool second stream of gaseous mixture to the relatively low pressure and partially liquefying the second stream, means separating the expanded second stream into a vapor portion and a liquid portion, means intermixing the vapor portion of the expanded second stream and the expanded first stream with liquid high boiling point fraction to cool the first stream of expanded gaseous mixture to at least [its saturation] *the precipitation* temperature

*of the high boiling point impurity* at the existing pressure and separating the resulting intermixture to provide a [saturated] vapor portion and a liquid portion, means feeding the [saturated] vapor portion to the high pressure fractionating zone, and means passing the liquid portion of the second stream of gaseous mixture and the liquid portion of the intermixture through filter means and adsorber means and then to the low pressure fractioning zone.

References Cited in the file of this patent or the original patent

UNITED STATES PATENTS

| | | |
|---|---|---|
| 1,968,518 | Fraser | July 31, 1934 |
| 2,537,046 | Garbo | Jan. 9, 1951 |
| 2,547,177 | Simpson | Apr. 3, 1951 |
| 2,572,933 | Houvener | Oct. 30, 1951 |
| 2,584,381 | Dodge | Feb. 5, 1952 |
| 2,615,312 | Yendall | Oct. 28, 1952 |
| 2,650,482 | Lobo | Sept. 1, 1953 |
| 2,699,047 | Karwat et al. | Jan. 11, 1955 |
| 2,846,853 | Matsch | Aug. 12, 1958 |